Oct. 19, 1971     L. SHAW     3,613,410
VEHICLE ACCELERATOR PEDAL LOCK
Filed June 24, 1970     2 Sheets-Sheet 1
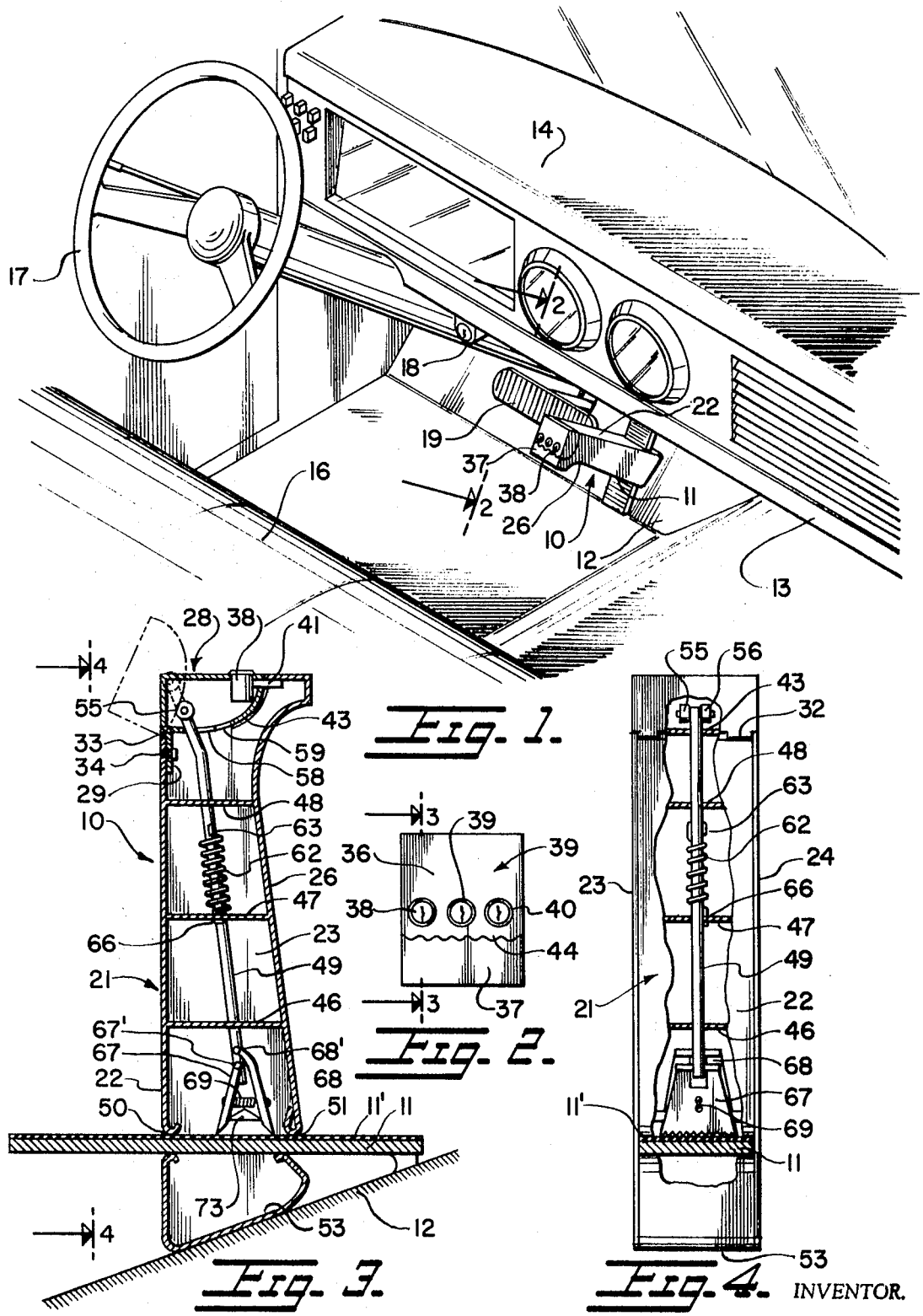
INVENTOR.
LEONARD SHAW
BY
Polachek & Saulsbury
ATTORNEYS Oct. 19, 1971   L. SHAW   3,613,410

VEHICLE ACCELERATOR PEDAL LOCK

Filed June 24, 1970   2 Sheets-Sheet 2

INVENTOR.
LEONARD SHAW
BY
Polachek & Saulsbury
ATTORNEYS

United States Patent Office 3,613,410
Patented Oct. 19, 1971

3,613,410
VEHICLE ACCELERATOR PEDAL LOCK
Leonard Shaw, 358 Montgomery St.,
Brooklyn, N.Y. 11225
Filed June 24, 1970, Ser. No. 49,257
Int. Cl. B60r 25/00; E05b 73/00
U.S. Cl. 70—202                                    7 Claims

ABSTRACT OF THE DISCLOSURE

An accelerator pedal lock is provided by this invention comprising an elongated closed housing having top, bottom, side, front and rear portions and in which there is a lock lever having tumbler locks extended thereacross and hinged to the top side of the housing and held closed when the tumbler lock projection engages with the stationary part of the front of the housing. A latch operating rod pivotally connected to the tumbler lock lever and extends longitudinally through the housing and has sharpened grip members for engaging the top of the pedal when the pedal has been received through bottom and top slots of the housing. The pedal will be wedged upwardly from the inclined floor from which the pedal extends and in locked position. A biasing spring is anchored on the rod and connected to the housing to bias the gripping members in engagement with the top of the lever.

---

This invention relates to a vehicle accelerator pedal lock.

It is the principal object of the present invention to provide a pedal lock which can be extended longitudinally over the accelerator pedal and which will wedge the pedal upwardly from the inclined floor thereunder and which will have such gripping engagement therewith that it cannot be readily slid off until unlocked by the owner of the vehicle.

It is another object of the invention to provide a pedal lock in which sharpened edges of a latch lock will be forcibly engaged upon the top surface of the pedal lever when the rod is forced downwardly by a cylinder lock lever carried by the front portion of the housing and when the cylinder locks are extended will be held closed within an opening in the front of the housing by engagement with a stationary part thereof.

It is another object of the invention to provide in the assembly of the lock means for rendering unavailable certain of the hinge pins for connecting the tumbler lock lever with the housing and to provide engagement running along the edge of the tumbler lock lever which provides serrations rendering it difficult for an instrument to be extended through the front of the lock to effect rupture or disengagement of the tumbler lock's latch with the housing.

It is still a further object of the invention to provide a series of key operated tumbler locks upon the tumbler lock closure lever any one of which will be known to the operator and can be used for releasing tumbler lock and the grip of the gripping members of the operating rod with the accelerator pedal.

Another object of the invention is to provide an accelerator pedal lock having the above objects in mind which is of simple construction, inexpensive to manufacture, easy to apply to the accelerator pedal, light in weight, has minimum number of parts, will provide wedging action between the lever and the floor board, efficient and effective in use.

For other objects and for a better understanding of the invention, reference would be had to the following detailed description taken in connection with the accompanying drawing, in which:

FIG. 1 is a perspective view of the accelerator pedal lock embodying features of the present invention and of the interior of the vehicle, showing the lock in its attached and locked position on the accelerator pedal lever.

FIG. 2 is a front elevational view of the pedal lock looking upon the lock face thereof and as viewed on line 2—2 of FIG. 1.

FIG. 3 is a vertical sectional view of the pedal lock and of the accelerator as viewed generally on line 3—3 of FIG. 2, the pedal lock extending perpendicularly through the pedal lever and gauging at its lower end the inclined floor board.

FIG. 4 is a vertical under face view of the pedal lock with portions broken away to show an interior thereof and the connection thereof with the pedal lever, the lever being shown in transverse section.

Figure 5:
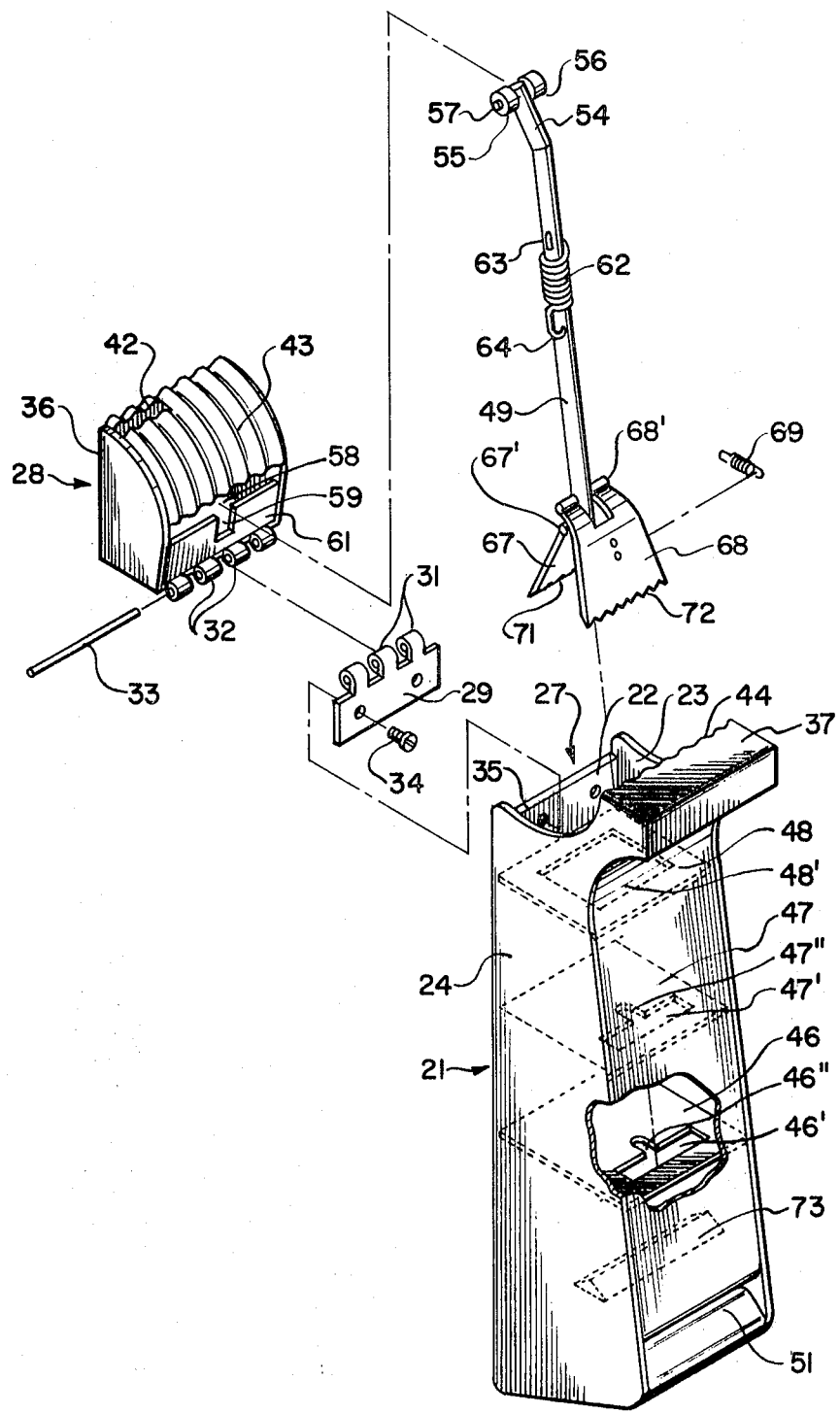
FIG. 5 is an enlarged perspective and exploded view of the pedal lock with the part removed from the main house and the main house being broken away to show the interior thereof.

Referring now to the figures 10 represents generally the assembled pedal lock embodying the features of the invention that if attached to an accelerator pedal lever as indicated at 11 in FIG. 1 that normally extends downwardly along an inclined floor board 12 located under dash board 13 of a vehicle 14 and located forwardly of driver's seat 16 and steering wheel 17. Normally a vehicle is locked when ignition key is removed from the ignition box 18 depending from lower edge of dash board 13. Forwardly of the driver's seat is the usual clutch and brake control lever as indicated at 19. The present lock 10 is designed particularly for attachment to the gas accelerator pedal 11 but in principle can be readily adapted for use upon the clutch and brake pedal 19. The accelerator pedal 11 is hinged from a bottom located on the inclined floor board 12 and its upper end is free and is adapted to receive the accelerator pedal lock 10 by sliding the same as will be apparent downwardly over the upper free end of the pedal 11 to a location intermediate the length of the pedal and as best seen in FIGS. 1 and 3.

This accelerator pedal lock 10 comprises a generally tubular shape housing 21 having a top wall 22 that is square with side walls 23 and 24 and a curved and under cut wall 26 closing the floor side of the housing as viewed in FIG. 1.

The outer end of the housing 21 has an opening 27 in which is fitted a lock lever housing 28 that is hingedly connected on the top side 22 by a piano-type hinge connection consisting of a hing plate 29 having three top transversely aligned pin hinge projections 32 on the lock lever housing 28 and a hinge pin 33 extending through the hinge projections.

The hinge plate 29 is made secure to the top side 22 within the opening 27 by fastening screws 34 so that access cannot be had to the screws. The upper ends of the sides 23 and 24 extend upwardly from the upper edge 35 of top side 22 to overlie the ends of the pin 33 so that the pin 33 cannot be removed laterally from the hinge projections.

The box lever housing 28 that is hingable from opening 27 when closed has its top face 36 extending flush with a top face 37 to provide the front face of the pedal lock. This top face 36 carries three tumbler locks 38, 39 and 40 adapted to be operated by keys carried by the owner of the vehicle when extended into the key slots of the locks. Each lock has a latch projection 41 extended, projected and retracted through an opening 42 in a transversely serrated and curved wall 43, the upper ends of the serration adapted to match with separated edge 44 of stationary front face part 37 of lock housing 21. The serrated closure prevents a prying of an instrument to act upon lock elements 41 when projected through the opening 42 and under the front side face 36 of the lock latch lever 28. By having the three keyholes and locks, the thief will be led to believe that there has been provided a combination lock when in fact only the owner will know which one of the locks needs to be activated in order to effect the opening of the lever 36 and release of the lock. It will be noted in FIG. 5 that the opening 42 only partially extends across the lock lever 36 and thus only the key lock 38 and its latch projection 41 will be extended through the hole 42, the other locks 39 and 40 may be without latch levers.

The lock housing 21 has a series of vertically spaced floors 46, 47 and 48 having respectively transverse openings 46', 47' and 48' through which an elongated bent latch rod 51 extends from a connection with the front lock lever 28 for gripping engagement with the accelerator pedal lever which is extendable through rear and front slots 51, 52 in the respective curved bottom and top walls 26, 22 and beneath which there extends an inclined bottom wall 53 which will wedge the accelerator pedal 11 upwardly from and with the inclined floor panel 12 of the vehicle 14 thereby to hold the accelerator lever 11 elevated and away from the floor 12 so that the lever 11 cannot be depressed until the pedal lock 10 is removed from the lever.

The operating latch rod 49 is bent at its upper end as indicated at 54 and to which bent end there is secured on opposite sides thereof roller elements 55 and 56 attached thereto by a rivet pin 57. This bent end 54 extends through a T-shaped slot 58 lying below the serrated face 43 on the underside of the box lever 36 and having a central depressed notch 59 in which the rod end 54 rides while the roller elements 55 and 56 will be held within the lock lever 28 for engagement with under panel 61 so that the latch rod 49 will be pulled upwardly as the lock lever 28 is released from the top portion 37 when unlocked by thrusting a key in the cylinder lock 38 and releasing its latch 41 from engagement thereunder. As illustrated in FIG. 3 lever 28 will be pivoted upwardly taking with it the rod 49. The rod 49 carries a coil spring 62 that is anchored at its upper end at 63 to the rod and is workable over the rod and anchored by its lower end 64 to intermediate platform or partition 47 as indicated at 66. The latch rod 49 extends through the openings 46', 47' and 48' of the respective platforms and these openings respectively have notches 46" and 47" in which the rods 49 will be centered and worked.

Pivoted one above the other on the lower end of the latch rod 49 are depending sharp bottom edge levers 67 and 68 adapted to engage as the lock cover 28 is forced to a closed position, with the top rubber layer 11' of the accelerator 11 so as to dig into the same and provide a sure grip with the lever 11. These sharp levers 67 and 68 are pivotally connected with the lower end of the rod 49, one above the other, the lever 68 being longer than the lever 67 and as indicated respectively at 67' and 68'. These sharp levers 67 and 68 are biased toward one another by a tension spring 69 connected therebetween. The lower edges of these levers are preferably serrated as indicated in FIG. 5 at 71 and 72, as to further insure a good grip relationship with the accelerator pedal.

Rigidly secured between the walls 23 and 24 and extending transversely across the inside of the lock housing 21 is a bridge member 73 of triangular section so that as the rod 49 is thrust downwardly the serrated edges of the levers 67 and 68 will ride downwardly over the inclined sides thereof and be separated and retained in their separated positions against the action of their tension spring 69 to have best engagement with the lever 11.

When it is desired to remove the pedal lock 10 from the lever 11, the driver will insert the key in the key opening of lock 38 so that the latch 41 will be released from the slot 42 in the serrated face 43 of the lever 28 and lock lever 28 will be elevated upwardly against the action of the spring 62 with the underface 61 of the lever 28 pulling upwardly on the rollers 55 and 56 so that the sharp edge levers 67 and 68 will be drawn upwardly over the bridge 73 and made free of the top layer 11' of the latch lever 11 so that the entire assembly of the pedal lock can be withdrawn laterally from the lever 11 and placed in the compartment usually provided in the dash 13 until further needed to lock the pedal lever 11.

It should now be apparent that there has been provided a vehicle gas accelerator pedal lock which the driver can use for locking his accelerator pedal in a raised position and wedged against the inclined floor surface from which the accelerator is extended.

What is claimed is:

1. A vehicle accelerator pedal lock comprising an elongated housing having elongated top, bottom, side, front and floor engaging portions, said top and bottom portions having transverse slots by which the housing can be extended longitudinally along the accelerator pedal and its floor engaging portion wedged with the floor board to hold the pedal extended therefrom, a lock lever having cylinder lock members hingeably connected to the top portion, said front portion having an opening therein into which the lock can be hinged and made secure through its cylinder lock latch with the front portion of the lock housing, a latch rod guided within the housing and slidably connected with the front lock lever and having sharpened grip members engageable with the top of the accelerator pedal when the front lock lever is forced into its closed position and its cylinder locks engaging with the front portion of the housing.

2. A vehicle accelerator pedal lock as defined in claim 1, in which said means for gripping the accelerator pedal comprises sharpened edge levers pivotally connected to the lower end of the operating rod so that the sharpened edges engage the top of the lever.

3. A vehicle accelerator pedal lock as defined in claim 2 and means for separating said sharpened grip members comprising a tension spring extending between the grip members and said housing having a bridge member secured between the sides of the housing of which the lower ends of the grip members will be expanded against the spring as the operating rod is thrust downwardly to effect the engagement of the gripping members with the latch lever.

4. A vehicle accelerator pedal lock as defined in claim 3 said housing having platforms longitudinally spaced from one another with open slots therein including notches in which the latch rod may slide and be guided and a tension spring surrounding the operating rod and anchored at one end thereto and having its other end anchored to one of the platforms.

5. A vehicle accelerator pedal lock as defined in claim 1 and said operating rod having a bent upper end and roller elements secured thereto at opposite sides thereof, said lock lever having a rear wall with a slot therein and said rollers engageable with the inner face of the rear wall for effecting as the lock lever is hinged out of the front of the housing to lift the latch lever and a biasing spring connected between the latch lever and housing biasing the latch lever grip members toward the accelerator pedal and the lock in its closed position.

6. A vehicle accelerator pedal lock as defined in claims 5 and 6, rear wall of the lock lever being serrated and said front portion having cooperating serrated edges to provide a union between the top of the lock lever and the top of the housing that will prevent easy insertion of a sharp instrument for engagement with the cylinder lock latch.

7. A vehicle accelerator pedal lock as defined in claim 6 and a plurality of cylinder lock elements extended across the lock lever, the rear wall of said lock lever having an opening adjacent to at least one of the locks so that one of the locks can be used effectively to lock the lock lever to the front stationary wall of the enclosure, the usable cylinder lock being known only to the driver of the vehicle.

References Cited

UNITED STATES PATENTS

| | | | |
|---|---|---|---|
| 1,309,925 | 7/1919 | Welsh | 70—202 |
| 1,374,048 | 4/1921 | Werts | 70—19 X |
| 1,596,083 | 8/1926 | Cyganczuk | 70—202 |
| 2,831,335 | 4/1958 | Kidd et al. | 70—58 |

FOREIGN PATENTS 245,864  7/1947  Switzerland  70—192

ALBERT G. CRAIG, JR., Primary Examiner

U.S. Cl. X.R.

70—19, 181, DIG. 81